(12) United States Patent
Sagan

(10) Patent No.: US 11,983,761 B2
(45) Date of Patent: May 14, 2024

(54) METHOD, MEDIUM, AND SYSTEM FOR PROVIDING CUSTOMIZABLE AND FLEXIBLE ORDERING INTERFACES

(71) Applicant: C22SMB, INC., Seattle, WA (US)

(72) Inventor: Olga Sagan, Seattle, WA (US)

(73) Assignee: C22SMB, INC., Seattle, WA (US)

( * ) Notice: Subject to any disclaimer, the term of this patent is extended or adjusted under 35 U.S.C. 154(b) by 0 days.

(21) Appl. No.: 17/410,891

(22) Filed: Aug. 24, 2021

(65) Prior Publication Data

US 2023/0067404 A1 Mar. 2, 2023

(51) Int. Cl.
*G06Q 30/00* (2023.01)
*G06F 3/0482* (2013.01)
*G06Q 30/0601* (2023.01)

(52) U.S. Cl.
CPC ....... *G06Q 30/0641* (2013.01); *G06F 3/0482* (2013.01); *G06Q 30/0633* (2013.01); *G06Q 30/0639* (2013.01)

(58) Field of Classification Search
CPC ........... G06Q 30/0641; G06Q 30/0633; G06Q 30/0639; G06Q 30/0235; G06F 3/0482
See application file for complete search history.

(56) References Cited

U.S. PATENT DOCUMENTS

| | | | |
|---|---|---|---|
| 6,915,271 B1 * | 7/2005 | Meyer | G06Q 30/02 705/14.35 |
| 7,797,198 B1 * | 9/2010 | Frederick | G06Q 30/06 705/26.1 |
| 9,047,607 B1 | 6/2015 | Curial et al. | |
| 9,195,950 B2 | 11/2015 | Schenken | |
| 10,163,119 B1 | 12/2018 | Bolton et al. | |
| 10,552,785 B2 | 2/2020 | Eda et al. | |

(Continued)

FOREIGN PATENT DOCUMENTS

WO WO-2007030503 A2 * 3/2007 ........... G06F 3/0482

OTHER PUBLICATIONS

Friksson, E., et al., "Contextual adaptation of omni-channel grocery retailers' online fulfilment centres", International Journal of Retail & Distribution Management, https:/Avww.emerald.com/insight/content/doi/10.1 108/JRDM-08-201 8-0182/full/html, Dec. 9, 2019, 19 pages. (Year: 2019).*

(Continued)

*Primary Examiner* — Matthew E Zimmerman
(74) *Attorney, Agent, or Firm* — Christensen O'Connor Johnson Kindness PLLC

(57) ABSTRACT

In some embodiments, a computer-implemented method for automatically choosing an ordering interface to be presented is provided. A computing system stores a first ordering rule definition and a second ordering rule definition. The first ordering rule definition includes at least one condition for disabling the first ordering rule definition. The computing system receives a request to present an ordering interface for a first order. In response to determining that the at least one condition for disabling the first ordering rule definition has not been met, an ordering interface is presented based on the first ordering rule definition. In response to determining that the at least one condition for disabling the first ordering rule definition has been met, an ordering interface is presented based on the second ordering rule definition.

20 Claims, 10 Drawing Sheets

(56) References Cited

U.S. PATENT DOCUMENTS

| | | |
|---|---|---|
| 2002/0007321 A1 | 6/2002 | Burton |
| 2003/0069785 A1* | 4/2003 | Lohse .................... G06Q 30/02 |
| | | 705/14.35 |
| 2003/0169284 A1* | 9/2003 | Dettinger ............ G06F 16/2428 |
| | | 715/708 |
| 2004/0098304 A1* | 5/2004 | Truong .............. G06Q 30/0207 |
| | | 705/14.1 |
| 2004/0128224 A1* | 7/2004 | Dabney .................. G06Q 40/00 |
| | | 705/37 |
| 2009/0106124 A1* | 4/2009 | Yang .................. G06Q 30/0601 |
| | | 705/26.1 |
| 2014/0279654 A1* | 9/2014 | Lievens ............. G06Q 10/0833 |
| | | 705/333 |
| 2015/0088731 A1* | 3/2015 | Ackerman ......... G06Q 10/0836 |
| | | 705/39 |
| 2015/0294262 A1 | 10/2015 | Nelson et al. |
| 2015/0302456 A1* | 10/2015 | Rego .................. G06Q 30/0235 |
| | | 705/14.35 |
| 2016/0210598 A1* | 7/2016 | Novick ................ G06Q 20/401 |
| 2017/0024804 A1 | 1/2017 | Tepfenhart, Jr. et al. |
| 2017/0083862 A1 | 3/2017 | Loubriel |
| 2017/0293886 A1 | 10/2017 | Bostick et al. |
| 2018/0189820 A1* | 7/2018 | Cooperman ....... G06Q 30/0243 |
| 2019/0311325 A1 | 10/2019 | Reblin et al. |
| 2021/0209635 A1* | 7/2021 | Czajka ............... G06Q 30/0205 |

OTHER PUBLICATIONS

Eriksson, E., et al., "Contextual adaptation of omni-channel grocery retailers' online fulfilment centres", International Journal of Retail & Distribution Management, https://www.emerald.com/insight/content/doi/10.1108/IJRDM-08-2018-0182/full/html, Dec. 9, 2019, 19 pages.

\* cited by examiner

METHOD, MEDIUM, AND SYSTEM FOR PROVIDING CUSTOMIZABLE AND FLEXIBLE ORDERING INTERFACES

BACKGROUND

While the generation of interfaces for Internet-based interactions is now commonplace, such interfaces are often relatively static. For example, many interfaces (such as ordering interfaces provided by retailers) are static, and a tedious process of reconfiguration must be performed in order to change ordering characteristics provided by the interface, including but not limited to delivery charges, the availability of limited-inventory products, and so on. Such interfaces cannot be reconfigured quickly to match rapidly changing conditions on which the interfaces should be based. What is desired are systems that allow for the rapid and automatic dynamic reconfiguration of interfaces responsive to changes in conditions.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method for automatically choosing an ordering interface to be presented is provided. A computing system stores a first ordering rule definition and a second ordering rule definition. The first ordering rule definition includes at least one condition for disabling the first ordering rule definition. The computing system receives a request to present an ordering interface for a first order. In response to determining that the at least one condition for disabling the first ordering rule definition has not been met, an ordering interface is presented based on the first ordering rule definition. In response to determining that the at least one condition for disabling the first ordering rule definition has been met, an ordering interface is presented based on the second ordering rule definition.

In some embodiments, a non-transitory computer-readable storage medium is provided. The computer-readable storage medium has instructions stored thereon that, in response to execution by one or more processors of a computing system, cause the computing system to perform actions including storing a first ordering rule definition and a second ordering rule definition, where the first ordering rule definition includes at least one condition for disabling the first ordering rule definition; receiving a request to present an ordering interface for a first order; in response to determining that the at least one condition for disabling the first ordering rule definition has not been met, presenting an ordering interface based on the first ordering rule definition; and in response to determining that the at least one condition for disabling the first ordering rule definition has been met, presenting an ordering interface based on the second ordering rule definition.

In some embodiments, a computing device is provided. The computing device includes a processor and a non-transitory computer-readable medium. The computer-readable medium has instructions stored thereon that, in response to execution by the processor, cause the computing device to perform actions including storing a first ordering rule definition and a second ordering rule definition, where the first ordering rule definition includes at least one condition for disabling the first ordering rule definition; receiving a request to present an ordering interface for a first order; in response to determining that the at least one condition for disabling the first ordering rule definition has not been met, presenting an ordering interface based on the first ordering rule definition; and in response to determining that the at least one condition for disabling the first ordering rule definition has been met, presenting an ordering interface based on the second ordering rule definition.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of the present disclosure provide systems and/or methods that reduce the configuration burden and allow for the dynamic generation of interfaces, including ordering interfaces for retailers. The zone configuration techniques described below provide technical improvements in the generation of ordering interfaces, at least in that ordering interfaces can be generated that more highly responsive to rules and changes in conditions than with previous ordering interface management techniques.

In some embodiments, an interface management computing system is provided that allows retailers to establish a plurality of zones (e.g., geographic areas) defining ordering rule definitions for orders associated with the zones (e.g., delivery charges, delivery window sizes, etc.). In some embodiments, multiple overlapping ordering rule definitions may be provided for a given zone, and a first ordering rule definition may be automatically disabled to fall-back to a second ordering rule definition when a condition is satisfied. This may allow the interface management computing system to change the behavior of the ordering interface in a manner that is highly responsive to changing conditions.

Figure 1:
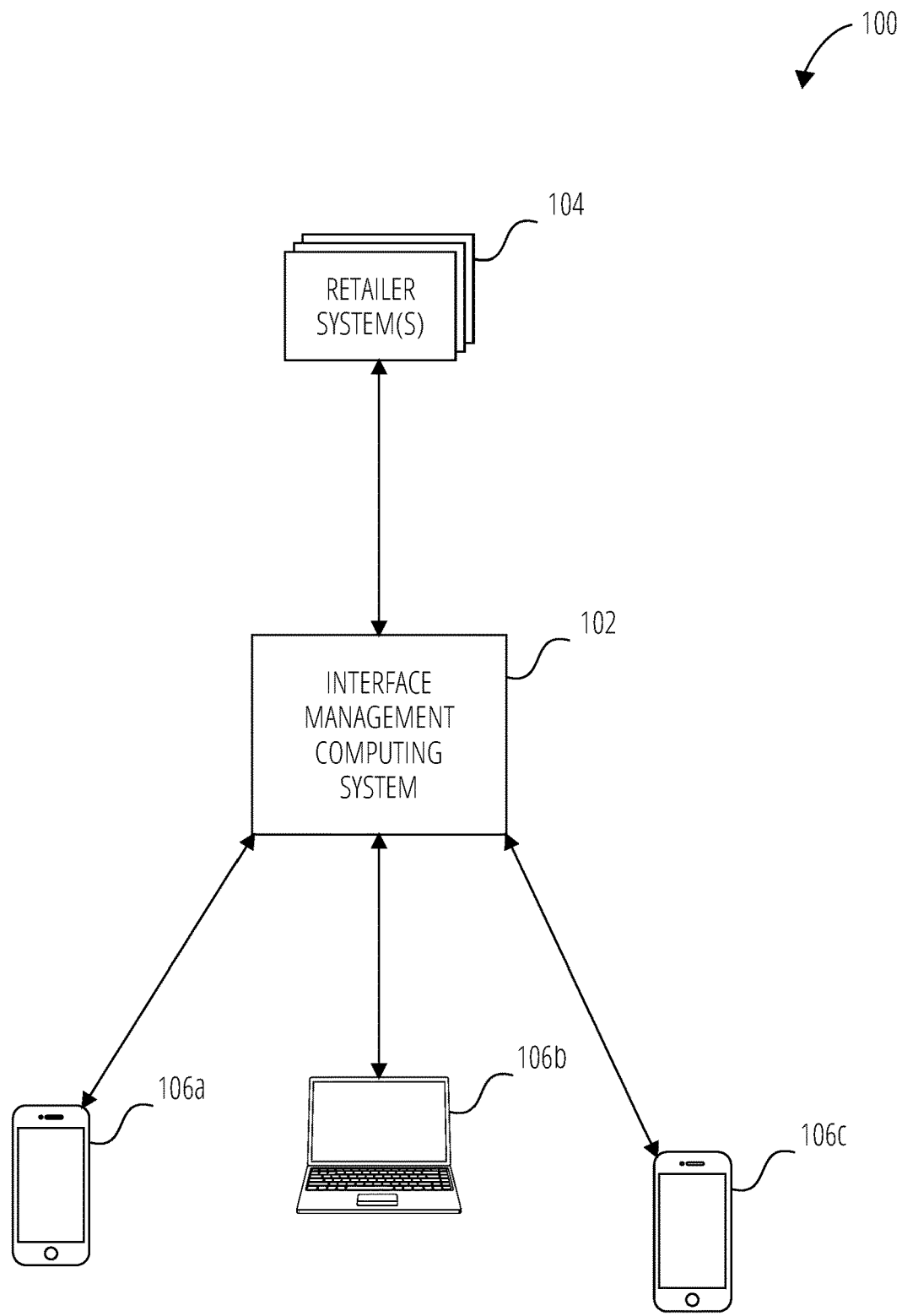
FIG. 1 is a schematic illustration of a non-limiting example embodiment of a system according to various aspects of the present disclosure.

FIG. 1 is a schematic illustration of a non-limiting example embodiment of a system according to various aspects of the present disclosure. As shown, the system 100 includes an interface management computing system 102, one or more retailer systems 104, and a plurality of end-user computing devices 106a-106c.

The retailer systems 104 may be any suitable type of computing device or collections of computing devices operated by retailers for communicating with the interface management computing system 102. Typically, a retailer system 104 may include one or more laptop computing devices, desktop computing devices, tablet computing devices, or mobile computing devices, though in some embodiments, the retailer system 104 may include other types of computing devices, including but not limited to special-purpose computing devices manufactured to interact with the interface management computing system 102 and/or computing devices of a cloud computing system.

In some embodiments, a retailer system 104 may include a client computing device that connects to the interface management computing system 102 in order to interact with a configuration interface provided by the interface management computing system 102. In some embodiments, the interface management computing system 102 may also provide functionality for recording orders, processing payments, and/or managing fulfillment of orders, and such functionality may be accessed by retailers through a retailer system 104. In some embodiments, the retailer system 104 may provide functionality for processing payments, recording orders, managing fulfillment of orders, and/or any other functionality for processing orders received through an ordering interface generated by the interface management computing system 102.

The end-user computing devices 106a-106c may be any suitable type of computing device operated by an end user for communicating with the interface management computing system 102. Typically, the end-user computing devices 106a-106c may be desktop computing devices, laptop computing devices, tablet computing devices, or mobile computing devices having client software (including but not limited to web browser software or custom app software) that allows the end-user computing devices 106a-106c to present an ordering interface generated by the interface management computing system 102 for interaction by an end-user. Each end-user may then use the ordering interface to create orders with the retailers operating the retailer systems 104 using the ordering rules as described in further detail below. Though three end-user computing devices 106a-106c are illustrated in FIG. 1, one will recognize that any number of end-user computing devices of any combination of types may be present in the system 100.

In some embodiments, communication between the interface management computing system 102 and the end-user computing devices 106a-106c, as well as communication between the interface management computing system 102 and the retailer systems 104, may use any suitable communication technique, including but not limited to one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof. Typically, communication between the components of the system 100 may take place over the Internet, though private networks may be used instead of or in addition to communication over the Internet.

Figure 2:
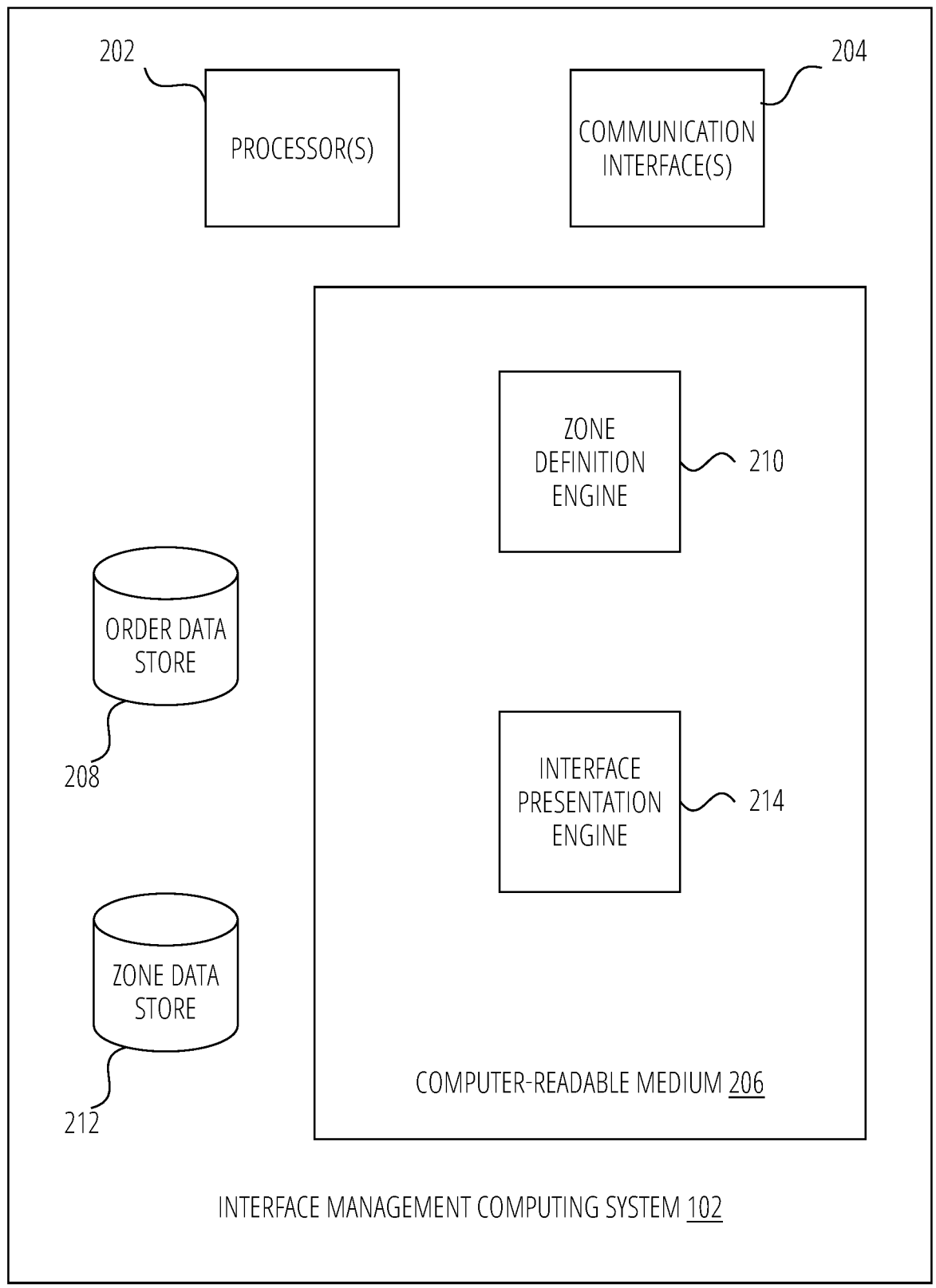
FIG. 2 is a block diagram that illustrates aspects of a non-limiting example embodiment of an interface management computing system according to various aspects of the present disclosure.

FIG. 2 is a block diagram that illustrates aspects of a non-limiting example embodiment of an interface management computing system according to various aspects of the present disclosure. The illustrated interface management computing system 102 may be implemented by any computing device or collection of computing devices, including but not limited to a desktop computing device, a laptop computing device, a mobile computing device, a server computing device, a computing device of a cloud computing system, and/or combinations thereof. The interface management computing system 102 is configured to provide a configuration interface to one or more retailer systems 104 to allow the configuration of ordering rule definitions, and to provide ordering interfaces based on the ordering rule definitions to one or more end-user computing devices 106a-106c.

As shown, the interface management computing system 102 includes one or more processors 202, one or more communication interfaces 204, an order data store 208, a zone data store 212, and a computer-readable medium 206.

In some embodiments, the processors 202 may include any suitable type of general-purpose computer processor. In some embodiments, the processors 202 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 204 include one or more hardware and or software interfaces suitable for providing communication links between components. The communication interfaces 204 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 206 has stored thereon logic that, in response to execution by the one or more processors 202, cause the interface management computing system 102 to provide a zone definition engine 210, and an interface presentation engine 214.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the zone definition engine 210 is configured to provide a configuration interface through which retailer systems 104 can manage definitions of zones and ordering rule definitions stored within the zone data store 212. In some embodiments, the interface presentation engine 214 is configured to use the information stored in the zone data store 212 to dynamically generate ordering interfaces to be presented by end-user computing devices 106a-106c, and to receive and store order information in the order data store 208. Further description of the configuration of each of these components is provided below.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 3:
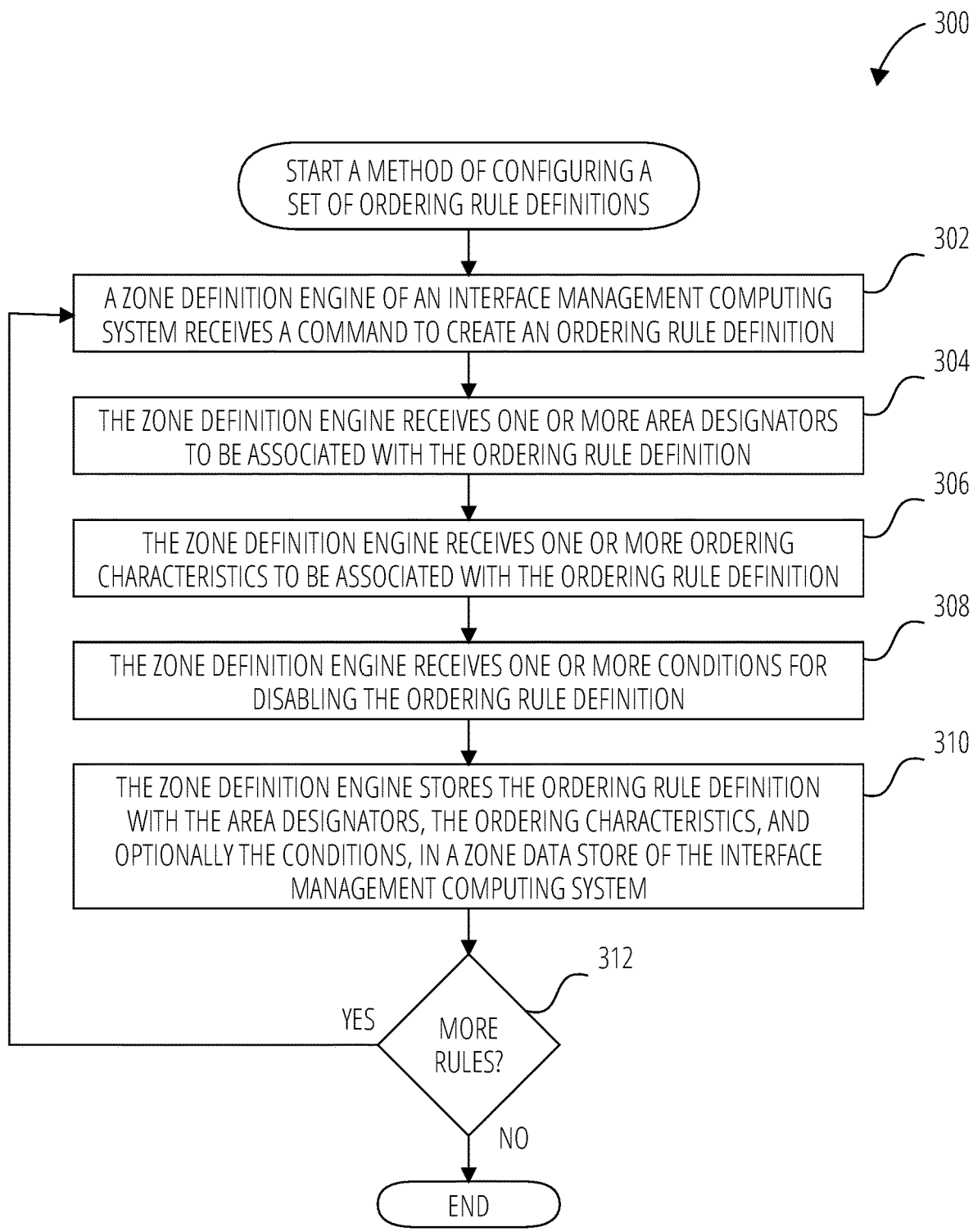
FIG. 3 is a flowchart that illustrates a non-limiting example embodiment of a method of configuring a set of ordering rule definitions according to various aspects of the present disclosure.

FIG. 3 is a flowchart that illustrates a non-limiting example embodiment of a method of configuring a set of ordering rule definitions according to various aspects of the present disclosure. In the method 300, the interface management computing system 102 receives information defining one or more ordering rule definitions, and stores the one or more ordering rule definitions for subsequent creation of ordering interfaces based thereon.

At block 302, a zone definition engine 210 of an interface management computing system 102 receives a command to create an ordering rule definition. In some embodiments, the zone definition engine 210 may present a configuration interface, and may receive the command to create the ordering rule definition via the actuation of an interface element of the configuration interface.

Figure 4:
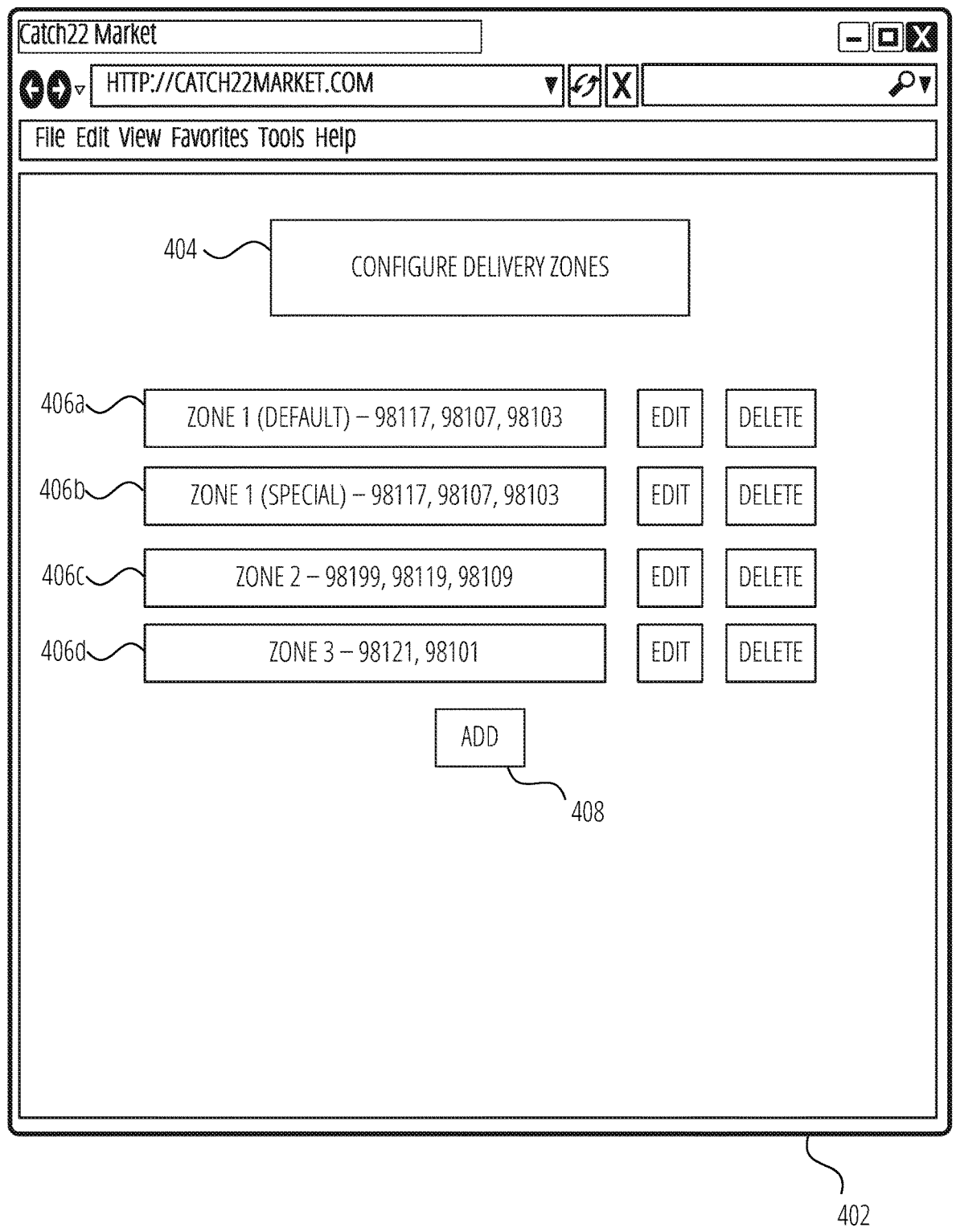
FIG. 4 and FIG. 5A—FIG. 5D are illustrations of a non-limiting example embodiment of a configuration interface according to various aspects of the present disclosure.

FIG. 4 is an illustration of a non-limiting example embodiment of a configuration interface generated by the zone definition engine 210 according to various aspects of the present disclosure. In the configuration interface 402, a header 404 indicates that the configuration interface 402 allows a user to configure delivery zones that are defined within the interface management computing system 102. The configuration interface 402 also includes an indication of a first ordering rule definition 406a, a second ordering rule definition 406b, a third ordering rule definition 406c, and a fourth ordering rule definition 406d, and provides options to edit or delete each of these ordering rule definitions. An add interface element 408 is also provided, and actuation of the add interface element 408 may cause the command to create the ordering rule definition to be created as described in block 302.

Returning to FIG. 3, at block 304, the zone definition engine 210 receives one or more area designators to be associated with the ordering rule definition. The one or more area designators indicate a geographical area for which the ordering rule definition is to be applied. Any suitable type of area designator may be used. For example (and as illustrated in FIG. 4 and FIG. 5A—FIG. 5D), in some embodiments zip codes may be used as an area designator. As shown, the first ordering rule definition 406a and the second ordering rule definition 406b are associated with three zip codes (98117, 98107, and 98103), the third ordering rule definition 406c is associated with three different zip codes (98199, 98119, and 98109), and the fourth ordering rule definition 406d is associated with two more zip codes (98121, 98101). The area designators for a given ordering rule definition may define a contiguous geographical area, or may define two or more non-contiguous geographical areas to be covered by the ordering rule definition. As shown in FIG. 4, more than one ordering rule definition may apply to a given geographical area, as will be discussed in further detail below.

Figure 5A:
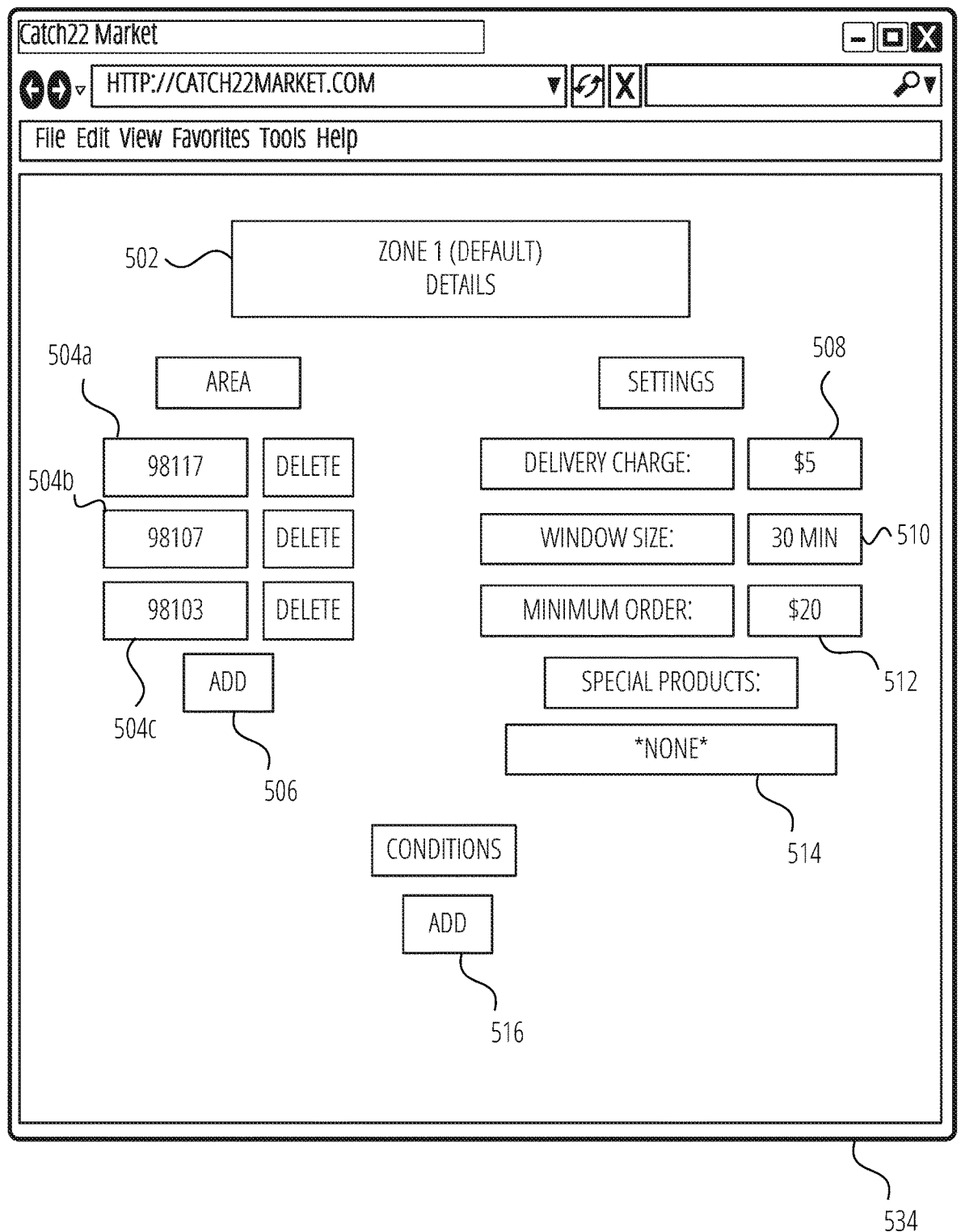
Figure 5B:
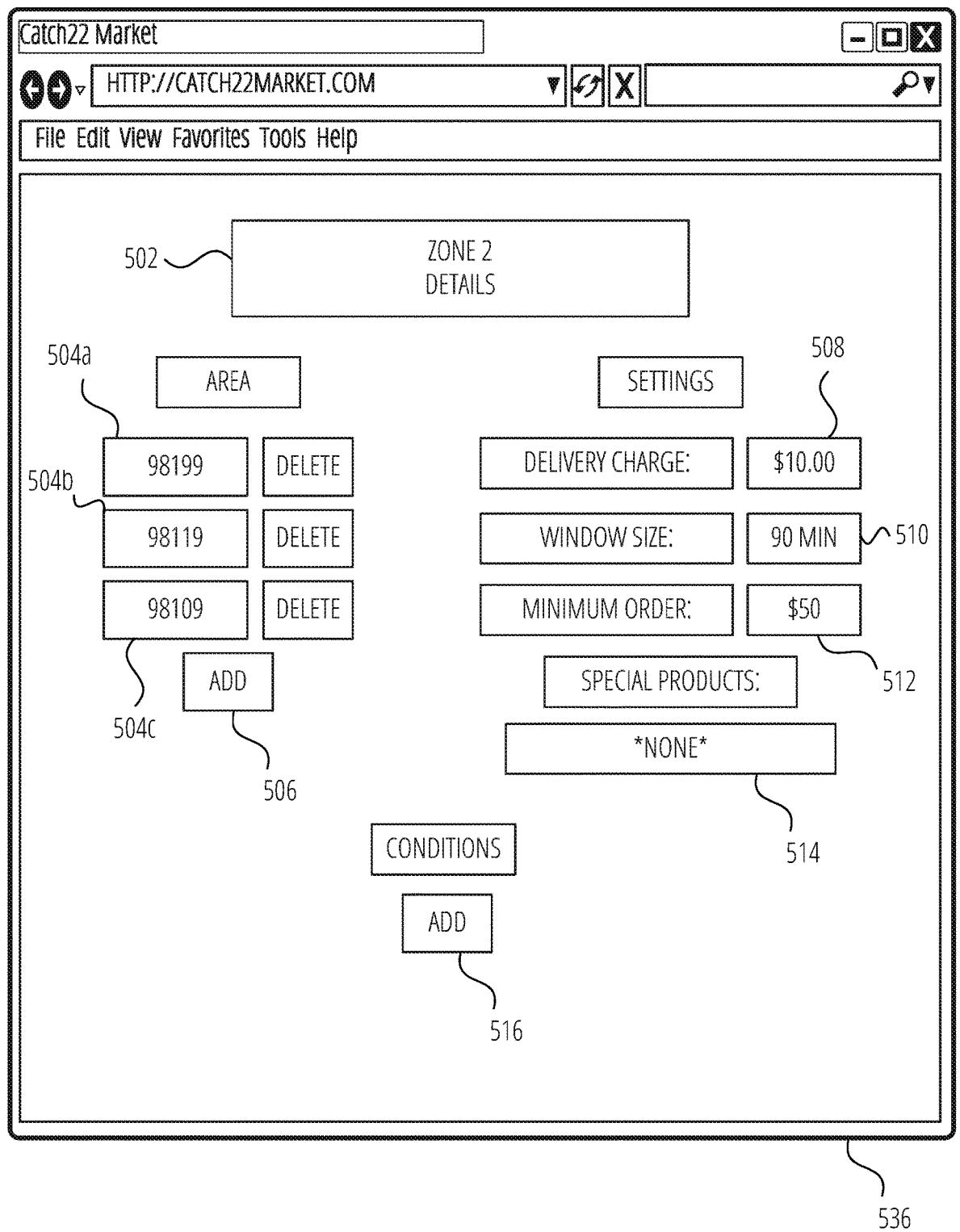
Figure 5C:
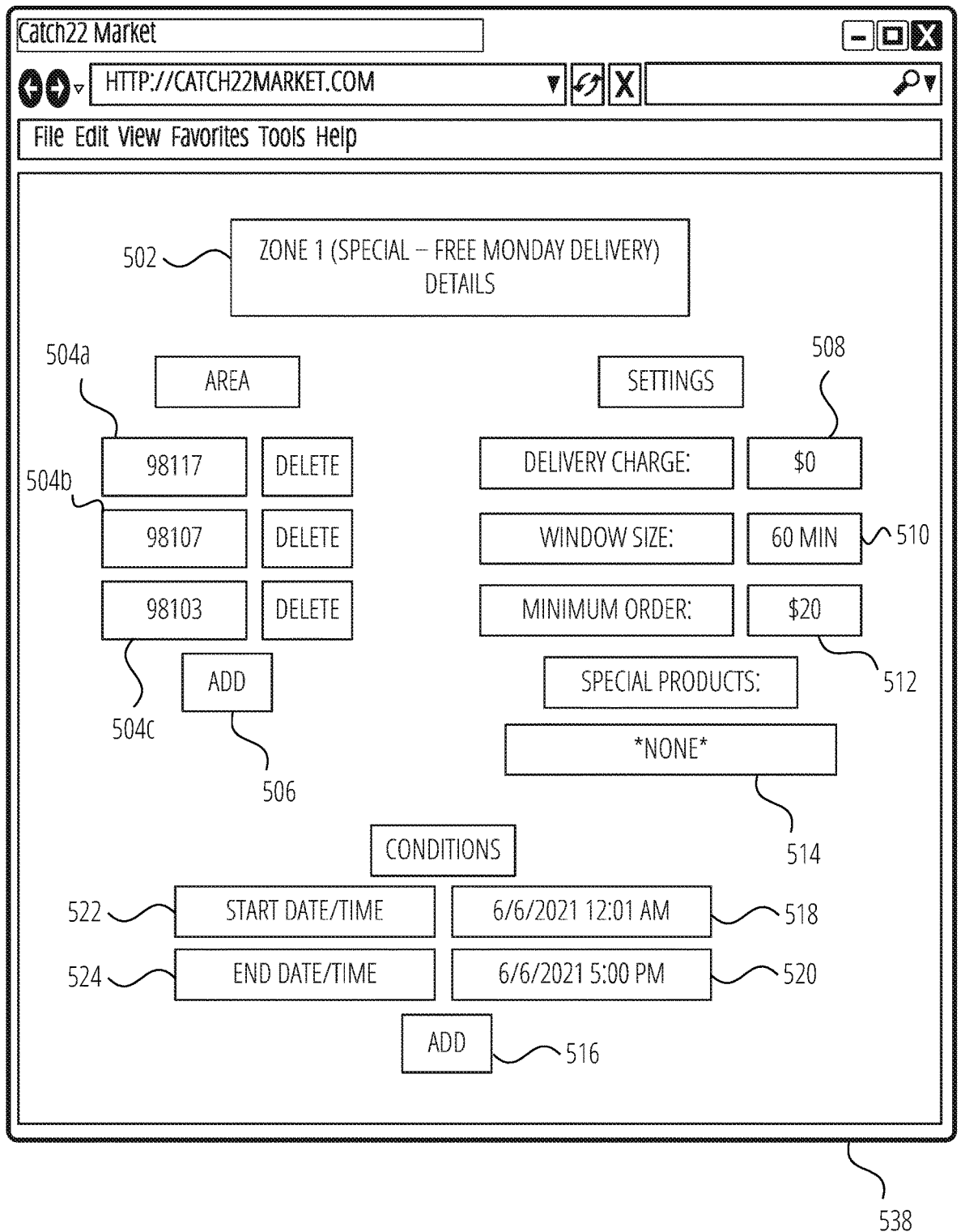
Figure 5D:
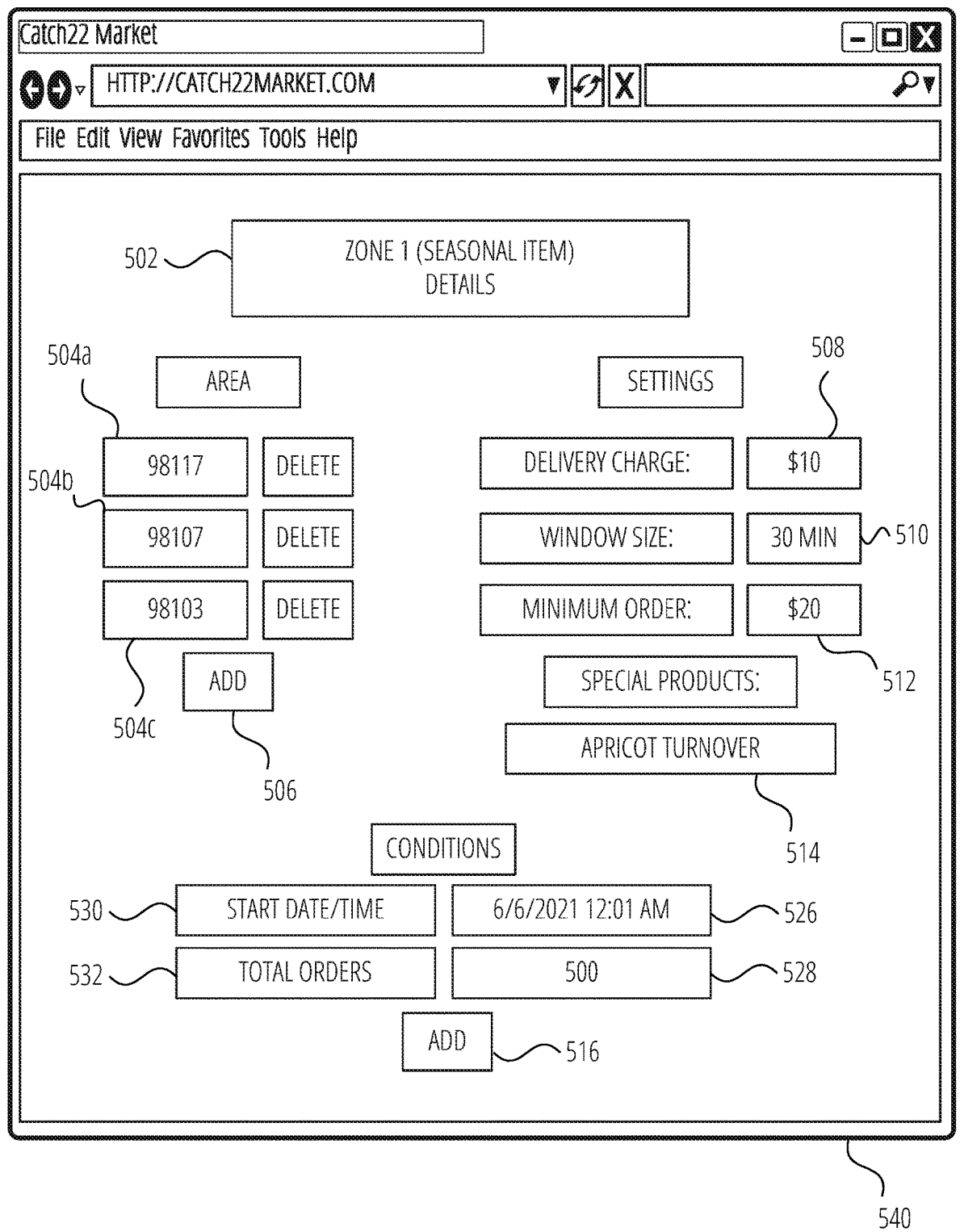

FIG. 5A is an illustration of a non-limiting example embodiment of an configuration interface for updating the first ordering rule definition 406a according to various aspects of the present disclosure. As shown, the first ordering rule configuration interface 534 includes a header 502 that indicates the first ordering rule configuration interface 534 is for updating the first ordering rule definition 406a. The first ordering rule configuration interface 534 also includes a first area designator 504a, a second area designator 504b, and a third area designator 504c. To add an area designator as described in block 304, a user may actuate an add area interface element 506 and the first ordering rule configuration interface 534 may present an interface element that allows the user to provide a new area designator. The first ordering rule configuration interface 534 also provides interface elements that allow the user to remove one or more of the first area designators 504a-504c. FIG. 5B, FIG. 5C, and FIG. 5D include similar elements that allow management of the area designators associated with the ordering rule definition.

Though FIG. 4 and FIG. 5A—FIG. 5D illustrate the use of zip codes, in some embodiments, other types of area designators may be used, including but not limited to area codes, geofences defined by latitude/longitude or what3words coordinates, governmental boundaries (e.g., city, county, state, or national boundaries), street addresses, and geographic points combined with distances or travel times from the geographic points. In some embodiments, some ordering rule definitions may use one type of area designator, while other ordering rule definitions may use another type of area designator. In some embodiments, a single ordering rule definition may be associated with more than one type of area designator.

Further, though FIG. 4 and FIG. 5A—FIG. 5D illustrate explicit zip codes as area designators, in some embodiments wildcard characters may be used to specify patterns to be used as area designators. For example, instead of explicitly listing every zip code, a wildcard such as a star character ("*") may be used to specify groups of zip codes (e.g., "98*" would match any zip code starting with the characters "98" and having zero or more characters thereafter). A zero-or-more-characters wildcard such as "*" is a non-limiting example of a wildcard character. In some embodiments, a different character may be used for the zero-or-more-characters wildcard. In some embodiments, other types of wildcard, including a one-or-more-characters wildcard (e.g., "+"), a single-character wildcard (e.g., "_"), a range-of-characters wildcard (e.g., "[0-9]"), or combinations thereof may be used. In some embodiments, a more sophisticated matching pattern, such as a regular expression, may be used to specify an area designator.

Returning to FIG. 3, at block 306, the zone definition engine 210 receives one or more ordering characteristics to be associated with the ordering rule definition. Ordering characteristics may be any type of information that defines how an order will be processed by a retailer system 104. Some non-limiting examples of ordering characteristics include an amount of a delivery charge, a wait time for delivery or pickup of an order, a window size (e.g., a precision with which the retailer system 104 will provide a delivery time), a minimum order value, a pre-order cutoff length (e.g., a time after which pre-orders will no longer be accepted), and one or more special products made available by the ordering rule definition.

The first ordering rule configuration interface 534 of FIG. 5A illustrates a delivery charge interface element 508, a window size interface element 510, a minimum order interface element 512, and a special products interface element 514. The delivery charge interface element 508 indicates an ordering characteristic that provides a $5 delivery charge. The window size interface element 510 indicates an ordering characteristic that provides a 30-minute window for delivery times (e.g., "your order will be delivered between 8:00 PM and 8:30 PM"). The minimum order interface element 512 indicates an ordering characteristic that provides a minimum order value. The special products interface element 514 indicates that there are no special products associated with this ordering rule definition. By interacting with any of the delivery charge interface element 508, window size interface element 510, minimum order interface element 512, or special products interface element 514, a user may change any of these ordering characteristics, thereby providing the ordering characteristics to the zone definition engine 210 as described in block 306.

FIG. 5B illustrates how these ordering characteristics may be changed in different zones. While the delivery charge, window size, and minimum order in FIG. 5A were #5, 30 minutes, and $20, respectively, FIG. 5B indicates a delivery charge of $10.00, a window size of 90 minutes, and a minimum order value of $50. These changes in ordering characteristics between zones may be provided by the retailers for any reason. As a non-limiting example, the differences between FIG. 5A and FIG. 5B may reflect a greater difficulty in completing deliveries to areas included in Zone 2 but not in Zone 1. FIG. 5C and FIG. 5D also show additional examples of different ordering characteristics. In particular, FIG. 5D illustrates the addition of a special product in the special products interface element 514, meaning that for ordering interfaces generated using the ordering rule definition managed by the fourth ordering rule configuration interface 540, the indicated special product is made available.

Returning to FIG. 3, at block 308, the zone definition engine 210 receives one or more conditions for disabling the ordering rule definition. By including one or more conditions for disabling a given ordering rule definition, the interface management computing system 102 is able to dynamically change the ordering interfaces on-the-fly in response to changes in the conditions, and is also able to provide simple configuration interfaces for configuring the conditions. Any suitable condition may be provided to disable a given ordering rule definition, including but not limited to a start and/or end time and a total number of orders to be accepted using the ordering rule definition. The first ordering rule configuration interface 534 and the second ordering rule configuration interface 536 illustrated in FIG. 5A and FIG. 5B, respectively, do not include any conditions. As such, these ordering rule definitions may act as default ordering rule definitions for their associated geographical areas, in that they will always be active. In FIG. 5C, the third ordering rule configuration interface 538 includes two conditions: a first condition type interface element 522 and a first condition value interface element 518 indicate that the associated ordering rule definition should be disabled before the date and time listed in the first condition value interface element 518, and a second condition type interface element 524 and second condition value interface element 520 indicate that the associated ordering rule definition should be disabled after the date and time listed in the second condition value interface element 520. An add condition interface element 516 allows a user to add additional conditions.

The start date/time and end date/time illustrated as conditions in the third ordering rule configuration interface 538 will have the effect of allowing the associated ordering rule definition—which provides for free delivery by virtue of the value in the delivery charge interface element 508—to be active between the start date/time and the end date/time. Though the third ordering rule configuration interface 538 illustrates the first condition value interface element 518 and second condition value interface element 520 as including date/time values, this example should not be seen as limiting. For example, in some embodiments, a day of the week instead of a set date (e.g., "Sunday" instead of "Sunday, June 6") may be used to establish a recurring condition. Though not illustrated, in some embodiments, an additional ordering characteristic may be an amount of lead time for an order. As such, the third ordering rule configuration interface 538 indicates conditions for "Free Monday Delivery" that only allow the ordering rule definition to be active on a Sunday between 12:01 AM and 5:00 PM, based on a lead time for an order (not illustrated) that indicates an order must be placed the previous day.

The fourth ordering rule configuration interface 540 illustrated in FIG. 5D is similar to the third ordering rule configuration interface 538 illustrated in FIG. 5C in that it also includes conditions. In fact, the fourth ordering rule configuration interface 540 includes a start date/time in a first condition type interface element 530 and first condition value interface element 526 that match the start date/time provided in the third ordering rule configuration interface 538. However, instead of providing an end date/time, the second condition type interface element 532 indicates a "total orders" condition type, and the second condition value interface element 528 indicates a value of "500." For the "total orders" condition, the interface management computing system 102 monitors a number of orders placed for the product indicated in the special products interface element 514. Once the number of orders placed reaches the value in the second condition value interface element 528, the condition will cause the associated ordering rule definition to be disabled.

Returning to FIG. 3, at block 310, the zone definition engine 210 stores the ordering rule definition with the area designators, the ordering characteristics, and optionally the conditions, in a zone data store 212 of the interface management computing system 102. The conditions are optionally stored because in some embodiments (such as the ordering rule definitions illustrated in FIG. 5A and FIG. 5B), there may not be any conditions associated with a given ordering rule definition.

In some embodiments, the area designators may be converted to a normalized form before being stored in the zone data store 212. For example, the area designators may be specified in the configuration interfaces as zip codes for ease of manipulation, but converted from zip codes to geographical regions defined by latitude/longitude coordinates and/or outlines for storage in the zone data store 212 in addition to or instead of the zip codes. This allows greater functionality, such as the ability to combine area designators provided in multiple different formats, and the ability to efficiently search area designators provided as zip codes (or other types of coded area designators) for locations specified as latitude/longitude.

The method 300 then proceeds to decision block 312, where a determination is made regarding whether more ordering rule definitions are to be created. In some embodiments, this determination may be based on whether the zone definition engine 210 receives a subsequent command to create an additional ordering rule definition. If a further ordering rule definition is to be created, then the result of decision block 312 is YES, and the method 300 returns to block 302 to process the next command to create an ordering rule definition. Otherwise, if no further ordering rule definitions are to be created, then the result of decision block 312 is NO, and the method 300 proceeds to an end block and terminates.

Though the method 300 is illustrated as proceeding from a start block to an end block in a single operation path, one will recognize that in some embodiments, the actions of the method 300 may be repeated multiple times, and may be performed in parallel or in different orders than the illustrated order. In some embodiments, the method 300 may be executed a first time before any ordering interfaces have been generated, and may be executed again to update the ordering rule definitions that are being used by the interface management computing system 102 to generate ordering interfaces after having generated one or more ordering interfaces.

Further, though the method 300 describes the creation of a new ordering rule definition, in some embodiments, a similar method may be used to update an existing ordering rule definition. To update an existing ordering rule definition instead of creating a new ordering rule definition, the method 300 may receive an indication of an existing ordering rule definition to update at block 302, and may receive some, but not all, of the information gathered in block 304, block 306, and block 308 if not all of the information is being updated. In some embodiments, the zone definition engine 210 may also accept commands from a user to delete existing ordering rule definitions, in which case the zone definition engine 210 may remove the indicated ordering rule definitions from the zone data store 212.

Figure 6:
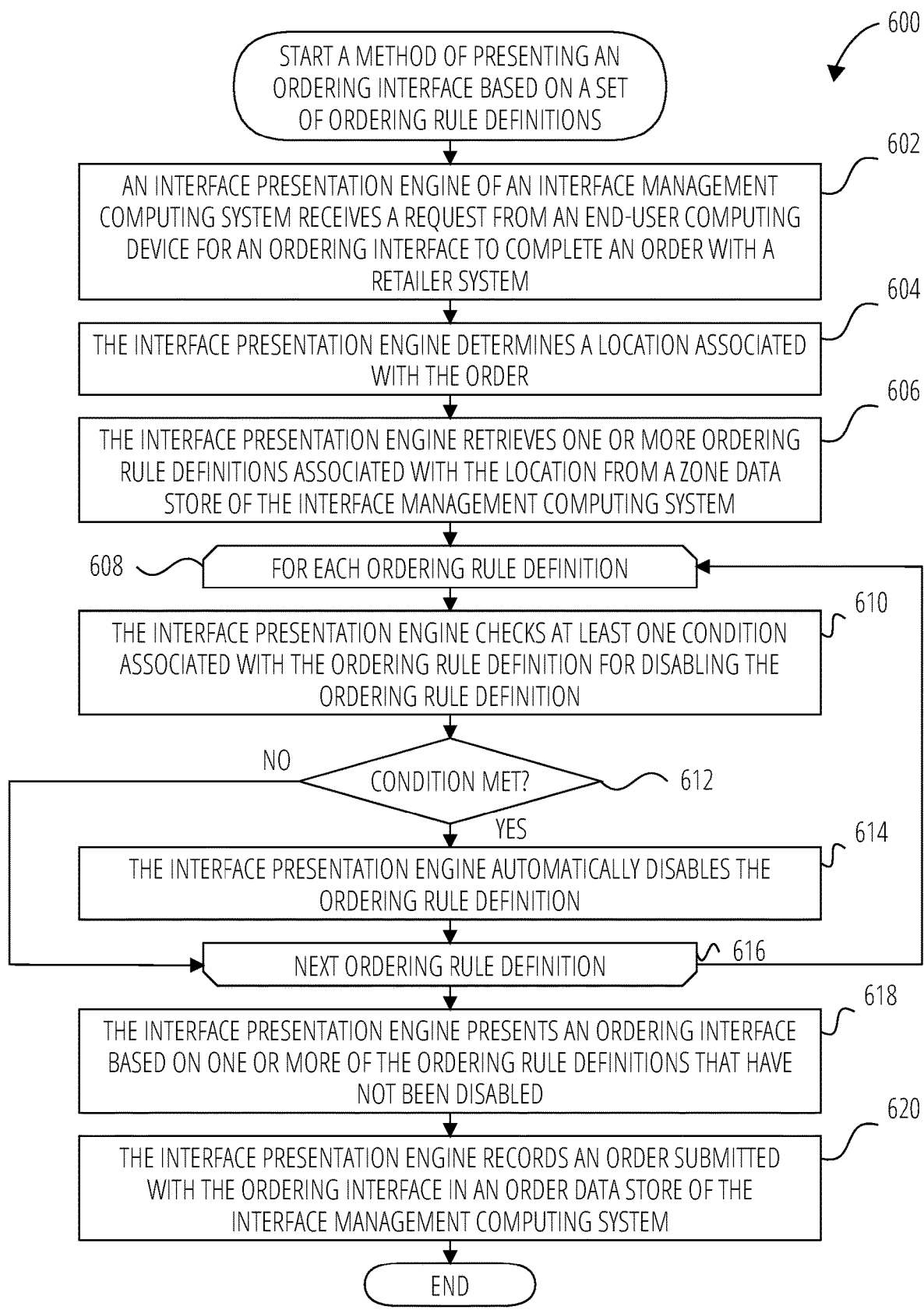
FIG. 6 is a flowchart that illustrates a non-limiting example embodiment of a method of presenting an ordering interface based on a set of ordering rule definitions according to various aspects of the present disclosure.

FIG. 6 is a flowchart that illustrates a non-limiting example embodiment of a method of presenting an ordering interface based on a set of ordering rule definitions according to various aspects of the present disclosure. By using conditions of the ordering rule definitions to understand when to enable and disable various ordering rule definitions, the method 600 is capable of generating ordering interfaces in a way that is highly responsive to changes in the conditions.

From a start block, the method 600 proceeds to block 602, where an interface presentation engine 214 of an interface management computing system 102 receives a request from an end-user computing device for an ordering interface to complete an order with a retailer system 104. In some embodiments, a user of the end-user computing device may use a standard web browser or an app to connect to a service provided by the interface management computing system 102 (such as a web service or an application programming interface (API)) that provides either the ordering interface or information that allows the end-user computing device to generate the ordering interface.

At block 604, the interface presentation engine 214 determines a location associated with the order. In some embodiments, the interface presentation engine 214 may determine the location associated with the order by using location services provided by the end-user computing device to obtain a geolocation of the end-user computing device itself. In some embodiments, the interface presentation engine 214 may request that a user of the end-user computing device enter or select a location to be associated with the order (such as a delivery address, a pickup location (e.g., a brick-and-mortar retail location, locker, or other permanent physical pickup location), or a temporary pickup location (e.g., a pop-up retail location temporarily present at a brick-and-mortar retail location, or a scheduled location of a food truck or other mobile pickup location).

At block 606, the interface presentation engine 214 retrieves one or more ordering rule definitions associated with the location from a zone data store 212 of the interface management computing system 102. In some embodiments, the interface presentation engine 214 may retrieve each ordering rule definition that includes an area designator that matches the location associated with the order.

In some embodiments, the interface presentation engine 214 may translate the location into a format that matches formats in which the area designators are specified in the zone data store 212. For example, if the area designators are specified as zip codes, the interface presentation engine 214 may determine a zip code associated with the location in order to search for ordering rule definitions that include the zip code in which the location is located. As another example, if the area designators are stored in the zone data store 212 in a normalized format, the interface presentation engine 214 may convert the location to the normalized format to be compared to the area designators (e.g., if the location is provided as a street address and the normalized form of the area designators is provided as a set of coordinates that define a geographic outline, the street address may be converted to a latitude/longitude value for comparison to the normalized form of the area designators).

The method 600 then proceeds to a for-loop defined between a for-loop start block 608 and a for-loop end block 616, wherein each of the ordering rule definitions retrieved from the zone data store 212 are processed to determine if they should be disabled. From the for-loop start block 608, the method 600 proceeds to block 610, where the interface presentation engine 214 checks at least one condition associated with the ordering rule definition for disabling the ordering rule definition. For example, for a condition that includes a start time, the interface presentation engine 214 may check whether a current time is before the start time, thus indicating that the ordering rule definition should be disabled. As another example, for a condition that includes an end time, the interface presentation engine 214 may check whether a current time is after the end time, thus indicating that the ordering rule definition should be disabled. As yet another example, for a condition that includes a maximum number of orders, the interface presentation engine 214 may compare a previous number of orders processed using the ordering rule definition, and may find that the condition for disabling the ordering rule definition has been met if the previous number of orders is greater than the maximum number of orders. In some embodiments, the interface presentation engine 214 may check all of the conditions associated with the ordering rule definition to determine if any of the conditions indicate that the ordering rule definition should be disabled. In some embodiments, the interface presentation engine 214 may check conditions associated with the ordering rule definition to determine if any of the conditions indicate that the ordering rule definition should be disabled, and may stop checking further conditions associated with the ordering rule definition once a condition is found that indicates that the ordering rule definition should be disabled.

At decision block 612, a determination is made based on whether a condition for disabling the ordering rule definition was met. If a condition for disabling the ordering rule definition was found to be met at block 610, then the result of decision block 612 is YES, and the method 600 proceeds to block 614, where the interface presentation engine 214 automatically disables the ordering rule definition, and then to for-loop end block 616. Otherwise, if no conditions for disabling the ordering rule definition were found to be met at block 610, then the result of decision block 612 is NO, and the method 600 proceeds directly to for-loop end block 616.

At for-loop end block 616, the interface presentation engine 214 determines whether any further ordering rule definitions remain to be processed. If so, then the method 600 returns to for-loop start block 608 to process the next ordering rule definition to determine whether it should be automatically disabled. Otherwise, if all of the ordering rule definitions have been processed, then the method 600 proceeds from for-loop end block 616 to block 618.

At block 618, the interface presentation engine 214 presents an ordering interface based on one or more of the ordering rule definitions that have not been disabled. In some embodiments, the ordering interface may include elements that are determined by the ordering characteristics specified in the ordering rule definitions that were not disabled. In some embodiments, the ordering interface may include a product page, a search result, a product listing, a shopping cart, a checkout page, and/or any other type of interface having elements determined by the ordering characteristics.

In some embodiments, the ordering rule definitions may be stored in the zone data store 212 with a rank order, such that the ordering interface presented by the interface presentation engine 214 is based on the highest ranked ordering rule definition that was retrieved at block 606 that was not disabled at block 614. In some embodiments, the ordering interface may be based on a composition of multiple ordering rule definitions retrieved at block 606 that were not disabled at block 614. For example, a first ordering rule definition may specify a minimum order value, and a second ordering rule definition may specify a delivery charge, and if neither ordering rule definition was disabled at block 614 the ordering interface presented by the interface presentation engine 214 may specify the minimum order value from the first ordering rule definition and the delivery charge from the second ordering rule definition.

In some embodiments, the user of the end-user computing device may be able to select an ordering rule definition to be applied for generating the ordering interface if multiple ordering rule definitions have conflicting ordering characteristics that cannot be composed. For example, if a first ordering rule definition specifies a delivery charge of $10 and a window size of 30 minutes, while a second ordering rule definition specifies a delivery charge of $1 and a window size of 120 minutes, a user may choose that the first ordering rule definition be applied if they prioritize the time of delivery over the value of the delivery charge, and may choose that the second ordering rule definition be applied if they prioritize the value of the delivery charge over the time of delivery.

At block 620, the interface presentation engine 214 records an order submitted with the ordering interface in an order data store 208 of the interface management computing system 102. In some embodiments, the interface presentation engine 214 may record an ordering rule definition associated with the order along with the order so that the ordering characteristics may be applied to the order properly. In some embodiments, the interface management computing system 102 may provide the order to a corresponding retailer system 104 to fulfill the order. In some embodiments, the interface management computing system 102 may itself take steps to help fulfill the order. In some embodiments, the interface presentation engine 214 may later consult orders stored in the order data store 208 to evaluate conditions in the ordering rule definitions, including but not limited to conditions that specify a maximum number of orders associated with a given ordering rule definition.

The method 600 then proceeds to an end block and terminates.

Figure 7:
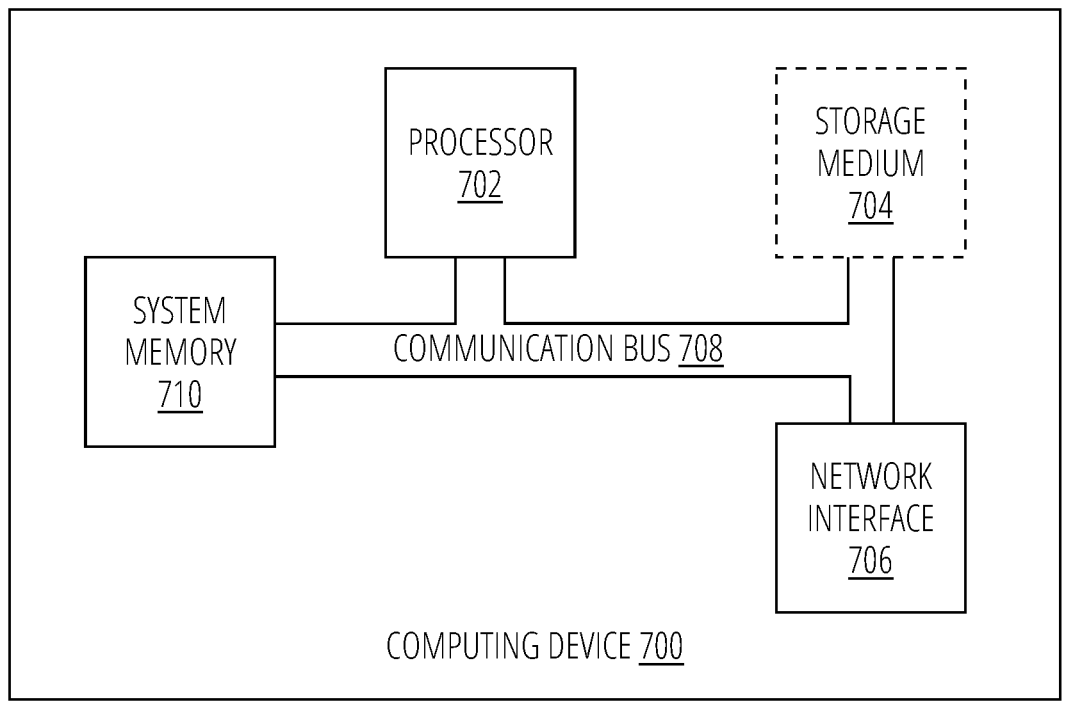
FIG. 7 is a block diagram that illustrates a non-limiting example embodiment of a computing device appropriate for use as a computing device with embodiments of the present disclosure.

FIG. 7 is a block diagram that illustrates aspects of an exemplary computing device 700 appropriate for use as a computing device of the present disclosure. While multiple different types of computing devices were discussed above, the exemplary computing device 700 describes various elements that are common to many different types of computing devices. While FIG. 7 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 700 may be any one of any number of currently available or yet to be developed devices.

In its most basic configuration, the computing device 700 includes at least one processor 702 and a system memory 710 connected by a communication bus 708. Depending on the exact configuration and type of device, the system memory 710 may be volatile or nonvolatile memory, such as read only memory ("ROM"), random access memory ("RAM"), EEPROM, flash memory, or similar memory technology. Those of ordinary skill in the art and others will recognize that system memory 710 typically stores data and/or program modules that are immediately accessible to and/or currently being operated on by the processor 702. In this regard, the processor 702 may serve as a computational center of the computing device 700 by supporting the execution of instructions.

As further illustrated in FIG. 7, the computing device 700 may include a network interface 706 comprising one or more components for communicating with other devices over a network. Embodiments of the present disclosure may access basic services that utilize the network interface 706 to perform communications using common network protocols. The network interface 706 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 706 illustrated in FIG. 7 may represent one or more wireless interfaces or physical communication interfaces described and illustrated above with respect to particular components of the computing device 700.

In the exemplary embodiment depicted in FIG. 7, the computing device 700 also includes a storage medium 704.

However, services may be accessed using a computing device that does not include means for persisting data to a local storage medium. Therefore, the storage medium 704 depicted in FIG. 7 is represented with a dashed line to indicate that the storage medium 704 is optional. In any event, the storage medium 704 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 702, system memory 710, communication bus 708, storage medium 704, and network interface 706 are known and commercially available. For ease of illustration and because it is not important for an understanding of the claimed subject matter, FIG. 7 does not show some of the typical components of many computing devices. In this regard, the computing device 700 may include input devices, such as a keyboard, keypad, mouse, microphone, touch input device, touch screen, tablet, and/or the like. Such input devices may be coupled to the computing device 700 by wired or wireless connections including RF, infrared, serial, parallel, Bluetooth, Bluetooth low energy, USB, or other suitable connections protocols using wireless or physical connections. Similarly, the computing device 700 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

The invention claimed is:

1. A computer-implemented method for automatically choosing an ordering interface to be presented to a customer of a retailer that operates one or more temporary pickup locations, the method comprising:
    storing, by a computing system, a first ordering rule definition, a second ordering rule definition, and a third ordering rule definition, wherein the first ordering rule definition includes at least one condition for disabling the first ordering rule definition, wherein the first ordering rule definition and the second ordering rule definition are associated with a first geographic area, and wherein the third ordering rule definition is associated with a second geographic area;
    receiving, by the computing system, a request from the customer to present an ordering interface for a first order for pickup at a temporary pickup location of the one or more temporary pickup locations;
    in response to receiving the request, determining, by the computing system, that the temporary pickup location is within the first geographic area; and
    in response to the determining that the temporary pickup location is within the first geographic area, presenting a first ordering interface or a second ordering interface, wherein the first ordering interface is based on at least the first ordering rule definition, and wherein the second ordering interface is based on at least the second ordering rule definition and is not based on the first ordering rule definition, by:
        in response to determining that the at least one condition for disabling the first ordering rule definition has not been met, presenting the first ordering interface; and
        in response to determining that the at least one condition for disabling the first ordering rule definition has been met, presenting the second ordering interface.

2. The computer-implemented method of claim 1, wherein the first ordering rule definition and the second ordering rule definition each include an ordering characteristic;
    wherein a value of the ordering characteristic for the first ordering rule definition is a first value; and
    wherein a value of the ordering characteristic for the second ordering rule definition is a second value different from the first value.

3. The computer-implemented method of claim 2, wherein the ordering characteristic is at least one of a wait time for pickup, an availability of a special product, and a time after which pre-orders will no longer be accepted.

4. The computer-implemented method of claim 1, wherein the method further comprises:
    receiving, by the computing system, a second request to present an ordering interface for a second order for pickup at a second temporary pickup location of the one or more temporary pickup locations;
    in response to receiving the second request, determining, by the computing system, that the second temporary pickup location is within the second geographic area; and
    in response to the determining that the second temporary pickup location is within the second geographic area, presenting a third ordering interface based on at least the third ordering rule definition.

5. The computer-implemented method of claim 1, wherein the first geographic area is specified by a first type of geographic identifier from a set of types of geographic identifiers;
    wherein the second geographic area is specified by a second type of geographic identifier from the set of types of geographic identifiers that is different from the first type of geographic identifier; and
    wherein the set of types of geographic identifiers includes at least zip codes, latitude/longitude coordinates, and outlines.

6. The computer-implemented method of claim 1, wherein the temporary pickup location is a scheduled location of a food truck or a pop-up retail location temporarily present at a brick-and-mortar retail location.

7. A non-transitory computer-readable storage medium having instructions stored thereon that, in response to execution by one or more processors of a computing system, cause the computing system to perform actions comprising:
    storing a first ordering rule definition, a second ordering rule definition, and a third ordering rule definition for generating ordering interfaces to be presented to customers of a retailer that operates one or more temporary pickup locations, wherein the first ordering rule definition includes at least one condition for disabling the first ordering rule definition, wherein the first ordering rule definition and the second ordering rule definition are associated with a first geographic area, and wherein the third ordering rule definition is associated with a second geographic area;
    receiving a request from a customer to present an ordering interface for a first order for pickup at a temporary pickup location of the one or more temporary pickup locations;
    in response to receiving the request, determining that the temporary pickup location is within the first geographic area; and in response to the determining that the temporary pickup location is within the first geographic area, presenting a first ordering interface or a second ordering interface, wherein the first ordering interface is based on at least the first ordering rule definition, and wherein the second ordering interface is based on at least the second ordering rule definition and is not based on the first ordering rule definition, by:
in response to determining that the at least one condition for disabling the first ordering rule definition has not been met, presenting the first ordering interface; and
in response to determining that the at least one condition for disabling the first ordering rule definition has been met, presenting the second ordering interface.

8. The computer-readable storage medium of claim 7, wherein the first ordering rule definition and the second ordering rule definition each include an ordering characteristic;
wherein a value of the ordering characteristic for the first ordering rule definition is a first value; and
wherein a value of the ordering characteristic for the second ordering rule definition is a second value different from the first value.

9. The computer-readable storage medium of claim 8, wherein the ordering characteristic is at least one of a wait time for pickup, an availability of a special product, and a time after which pre-orders will no longer be accepted.

10. The computer-readable storage medium of claim 7, wherein the actions further comprise:
receiving a second request to present an ordering interface for a second order for pickup at a second temporary pickup location of the one or more temporary pickup locations;
in response to receiving the second request, determining that the second temporary pickup location is within the second geographic area; and
in response to the determining that the second temporary pickup location is within the second geographic area, presenting a third ordering interface based on at least the third ordering rule definition.

11. The computer-readable storage medium of claim 7, wherein the first geographic area is specified by a first type of geographic identifier from a set of types of geographic identifiers;
wherein the second geographic area is specified by a second type of geographic identifier from the set of types of geographic identifiers that is different from the first type of geographic identifier; and
wherein the set of types of geographic identifiers includes at least zip codes, latitude/longitude coordinates, and outlines.

12. The computer-readable storage medium of claim 7, wherein the temporary pickup location is a scheduled location of a food truck or a pop-up retail location temporarily present at a brick-and-mortar retail location.

13. A computing device comprising:
a processor; and
a non-transitory computer-readable medium having instructions stored thereon that, in response to execution by the processor, cause the computing device to perform actions comprising:
storing a first ordering rule definition, a second ordering rule definition, and a third ordering rule definition for generating ordering interfaces to be presented to customers of a retailer that operates one or more temporary pickup locations, wherein the first ordering rule definition includes at least one condition for disabling the first ordering rule definition, wherein the first ordering rule definition and the second ordering rule definition are associated with a first geographic area, and wherein the third ordering rule definition is associated with a second geographic area;
receiving a request from a customer to present an ordering interface for a first order for pickup at a temporary pickup location of the one or more temporary pickup locations;
in response to receiving the request, determining that the temporary pickup location is within the first geographic area; and
in response to the determining that the temporary pickup location is within the first geographic area, presenting a first ordering interface or a second ordering interface, wherein the first ordering interface is based on at least the first ordering rule definition, and wherein the second ordering interface is based on at least the second ordering rule definition and is not based on the first ordering rule definition, by:
in response to determining that the at least one condition for disabling the first ordering rule definition has not been met, presenting the first ordering interface; and
in response to determining that the at least one condition for disabling the first ordering rule definition has been met, presenting the second ordering interface.

14. The computing device of claim 13, wherein the first ordering rule definition and the second ordering rule definition each include an ordering characteristic;
wherein a value of the ordering characteristic for the first ordering rule definition is a first value; and
wherein a value of the ordering characteristic for the second ordering rule definition is a second value different from the first value.

15. The computing device of claim 14, wherein the ordering characteristic is at least one of a wait time for pickup, an availability of a special product, and a time after which pre-orders will no longer be accepted.

16. The computing device of claim 13, wherein the actions further comprise:
receiving a second request to present an ordering interface for a second order for pickup at a second temporary pickup location of the one or more temporary pickup locations;
in response to receiving the second request, determining that the second temporary pickup location is within the second geographic area; and
in response to the determining that the second temporary pickup location is within the second geographic area, presenting a third ordering interface based on the third ordering rule definition.

17. The computing device of claim 16, wherein the temporary pickup location is a scheduled location of a food truck or a pop-up retail location temporarily present at a brick-and-mortar retail location.

18. The method of claim 1, wherein presenting the first ordering interface includes:
comparing a rank order of the first ordering rule definition to a rank order of the second ordering rule definition; and
in response to determining that the rank order of the first ordering rule definition is higher than the rank order of the second ordering rule definition, presenting the ordering interface based on the first ordering rule definition.

19. The method of claim 1, wherein presenting the first ordering interface includes:
   presenting the first ordering interface based on at least one ordering characteristic of the first ordering rule definition and at least one ordering characteristic of the second ordering rule definition.

20. The method of claim 1, wherein presenting the first ordering interface includes:
   detecting a conflict between an ordering characteristic of the first ordering rule definition and a corresponding ordering characteristic of the second ordering rule definition; and
   presenting the first ordering interface based on either the first ordering rule definition or the second ordering rule definition based on a prioritization of the ordering characteristics.

* * * * *